United States Patent [19]
Wang

[11] Patent Number: 6,137,845
[45] Date of Patent: Oct. 24, 2000

[54] METHOD OF DETERMINING AN ENCODING RATE IN A COMMUNICATION SYSTEM

[75] Inventor: Michael Mao Wang, Carpentersville, Ill.

[73] Assignee: Motorola, Inc., Schaumburg, Ill.

[21] Appl. No.: 09/293,545

[22] Filed: Apr. 16, 1999

[51] Int. Cl.[7] ...................................................... H03D 1/00
[52] U.S. Cl. ........................ 375/340; 375/225; 375/265; 375/341
[58] Field of Search ..................................... 375/340, 341, 375/225, 265, 377; 370/255, 465

[56] References Cited

U.S. PATENT DOCUMENTS

| | | | |
|---|---|---|---|
| 5,414,738 | 5/1995 | Bienz | 375/341 |
| 5,432,803 | 7/1995 | Liu et al. | 371/43 |
| 5,486,956 | 1/1996 | Urata | 360/65 |
| 5,671,255 | 9/1997 | Wang et al. | 375/341 |
| 5,878,098 | 3/1999 | Wang et al. | 375/377 |

*Primary Examiner*—Stephen Chin
*Assistant Examiner*—Mohammad Ghayour

[57] ABSTRACT

A method of determining an encoding rate associated with a received data frame in a communication system includes decoding (101) the received data frame at a first and second encoding rates to determine a first and second total metric, calculating (102) a discriminant function based on the first and second total metric, comparing (103) the discriminant function to a range of predetermined values having an upper predetermined range limit and a lower predetermined range limit, and selecting (104) one of the first and second rates as a determined encoding rate based on comparing (103) depending on whether the discriminant function is above the upper predetermined range limit or below the lower predetermined range limit.

19 Claims, 1 Drawing Sheet

6,137,845

METHOD OF DETERMINING AN ENCODING RATE IN A COMMUNICATION SYSTEM

FIELD OF THE INVENTION

The present invention relates generally to communications, and more particularly to a method for encoding rate determination in a communication system.

BACKGROUND OF THE INVENTION

In certain communication systems, such as in a code division multiple access (CDMA) cellular system as defined by interim specification (IS) IS-95, and other most recently defined communication systems such as Wide CDMA (WCDMA) and CDMA2000, or other systems commonly referred to as 3G systems, a receiver in the communication system determines an estimated encoding rate for each received frame. In such systems, the rate determination accuracy affects speech quality since any rate determination error typically causes annoying artifacts in the decoded speech signal. In addition, since rate determination is performed on a real-time basis, it is important that the rate determination process is performed in an efficient and cost effective manner. One or more such efficient method and apparatus are disclosed in the U.S. issued U.S. Pat. No. 5,878,098, Wang et al, issued on Mar. 2, 1999, having one common inventor with the present invention, and assigned to the assignee of the present invention, which is incorporated by reference herein. Nevertheless, rate determination in a communication system often times is so crucial in proper operation of the system that an improved method and apparatus are always desired.

Accordingly, there exists a need for an improved apparatus and method for performing rate determination in a communication system.

DETAILED DESCRIPTION OF THE PREFERRED EMBODIMENT(S)

Figure 1:
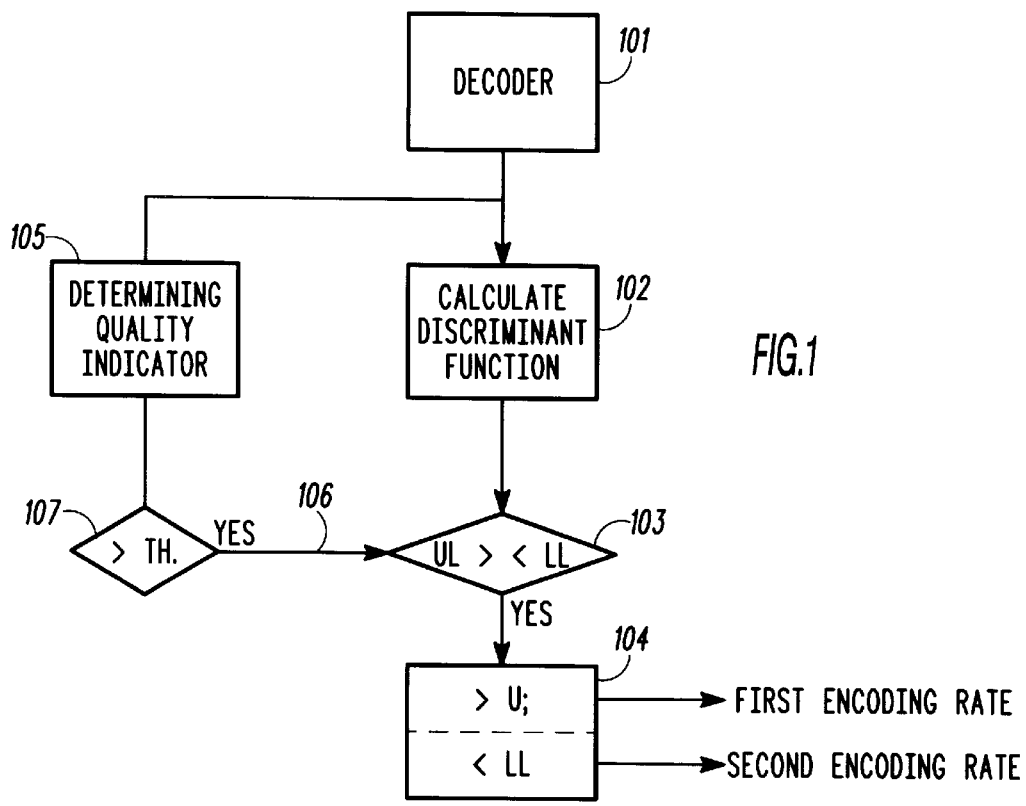
FIG. 1 depicts one or more aspects of the invention by way of a flow chart.

According to one or more aspects of the invention, a method of determining an encoding rate associated with a received data frame in a communication system includes decoding the received data frame at a first and second encoding rates to determine respectively a first and second total metric, and calculating a discriminant function based on the first and second total metric. The method further includes comparing the discriminant function to a range of predetermined values having an upper predetermined range limit and a lower predetermined range limit, and selecting one of the first and second rates as a determined encoding rate based on the step of comparing the discriminant function depending on whether the discriminant function is above the upper predetermined range limit or below the lower predetermined range limit. As a result, the determined encoding rate is more accurate and performed efficiently to decode the received data frame to produce decoded data, such as voice data.

The method includes erasing the received data frame based on the step of comparing the discriminant function when the discriminant function is above the lower predetermined range limit and below the upper predetermined range limit. Therefore, stated differently, if the dicriminant function value is at any value between the upper and lower predetermined value limits, herein called the erasure zone, the received data frame is erased because neither the first or the second encoding rate was an accurate encoding rate. In case, such as IS-95 or 3G systems, where there are more than two possible encoding rates, the frame is not erased. The method is continued for determining other discriminant functions based on possibility of other encoding rates. The discriminant functions are compared with the upper and lower limits to determine whether an accurate encoding rate can be detected.

The method is further made more accurate for determining an encoding rate by determining a first quality indicator corresponding to a quality of the decoded received data frame at the first rate, and adjusting the upper predetermined range limit depending on a value of the first quality indicator. The method includes comparing the first quality indicator with a first threshold, and if the first quality indicator is above the first threshold, the adjusting step includes adjusting the upper predetermined range limit from a first upper value to a second upper value, and if the first quality indicator is below the first threshold, the adjusting step includes adjusting the upper range limit from the first upper value to a third upper value. The third upper value is higher than the first upper value, and the second upper value is lower than the first upper value.

Similarly for the lower predetermined range limit, the method includes determining a second quality indicator corresponding to a quality of the decoded received data frame at the second rate, and adjusting the lower predetermined range limit depending on a value of the second quality indicator. The method includes the step of comparing the second quality indicator with a second threshold, and if the second quality indicator is above the second threshold, the adjusting step includes adjusting the lower predetermined range limit from a first lower value to a second lower value, and if the second quality indicator is below the second threshold, the adjusting step includes adjusting the lower range limit from the first lower value to a third lower value. The third lower value is lower than the first lower value, and the second lower value is higher than the first lower value. The method of determining the encoding rate is more accurate than prior art because the upper and lower range limit are dependent on the quality of decoded data frame. As the quality of the decoded data frame reaches a higher level, indicated by the quality indicator, the erasure zone as a result is narrowed. This would allow selecting an encoding rate more accurately which indirectly incorporates the quality of the encoded data frame in the decision making.

Referring to FIG. 1, one or more aspects of the invention are made clearer by way of reference to a flow chart depicted in FIG. 1. According to one or more aspects of the invention, a method of determining an encoding rate associated with a received data frame in a communication system includes decoding, at step 101, the received data frame at a first and second encoding rates to determine respectively a first and second total metric, and calculating, at step 102 a discriminant function based on the first and second total metric. The method further includes comparing, at step 103, the discriminant function to a range of predetermined values having an upper predetermined range limit (UL) and a lower predetermined range limit (LL), and selecting, at step 104, one of the first and second rates as a determined encoding rate based on the comparing step 103. The selection at step 104 depends on whether the discriminant function is above the upper predetermined range limit (UL) or below the lower predetermined range limit (LL). As a result, the determined encoding rate is more accurate and performed efficiently to decode the received data frame to produce decoded data, such as voice data. The accuracy is mainly due to comparison of the discriminant functions with a range of values bounded by UL and LL values.

The method includes erasing the received data frame based on the comparing step 103. When the discriminant function is above the lower predetermined range limit (LL) and below the upper predetermined range limit (UL), the discriminant function value falls into a zone bounded by UL and LL. Stated differently, if the dicriminant function value is at any value between the upper (UL) and lower (LL) predetermined value limits, herein called the erasure zone, the received data frame is erased because neither the first or the second encoding rate was an accurate encoding rate. In case, such as IS-95 or 3G systems, where there are more than two possible encoding rates, the frame is not erased at this step and is continued for determining other discriminant functions based on possibility of selecting other encoding rates.

The method is further made more accurate for determining an encoding rate by determining, at step 105, a first quality indicator corresponding to a quality of the decoded received data frame at the first rate, and adjusting, through input 106, the upper predetermined range limit (UL) depending on a value of the first quality indicator. The method includes comparing, at step 107, the first quality indicator with a first threshold (Th), and if the first quality indicator is above the first threshold (Th), the adjusting step includes adjusting the upper predetermined range limit (UL) from a first upper value to a second upper value, and if the first quality indicator is below the first threshold (Th), the adjusting step includes adjusting the upper range limit (UL) from the first upper value to a third upper value. The third upper value is higher than the first upper value, and the second upper value is lower than the first upper value.

Similarly for the lower predetermined range limit (LL), the method includes determining, at step 105, a second quality indicator corresponding to a quality of the decoded received data frame at the second rate, and adjusting, through input 106, the lower predetermined range limit (LL) depending on a value of the second quality indicator. The method includes the step of comparing, at step 107, the second quality indicator with a second threshold (Th), and if the second quality indicator is above the second threshold (Th), the adjusting step includes adjusting the lower predetermined range limit (LL) from a first lower value to a second lower value, and if the second quality indicator is below the second threshold, the adjusting step includes adjusting the lower range limit (LL) from the first lower value to a third lower value. The third upper value is lower than the first upper value, and the second upper value is higher than the first upper value.

In communication systems, such as one based on IS95 and 3G standards, the encoded frames may be encoded at an encoding rate selected from several possible encoding rates, such $\frac{1}{8}$, $\frac{1}{4}$, $\frac{1}{2}$ and full rates. In case of three possible encoding rates, the method of determining encoding rate of a received data frame includes decoding the received data frame at a first, second and third encoding rates to determine respectively a first, second and third total metric. The method further includes calculating a plurality of discriminant functions based on the first, second and third total metric. In this case, "dij" being the discriminant function based on "i" and "j" rates, there are three possible discriminant functions, namely: d12, d13, and d23. The method includes comparing the plurality of discriminant functions to a corresponding plurality of ranges of predetermined values, wherein each of the plurality of ranges having an upper predetermined limit (UL) and a lower predetermined limit (LL).

Figure 2:
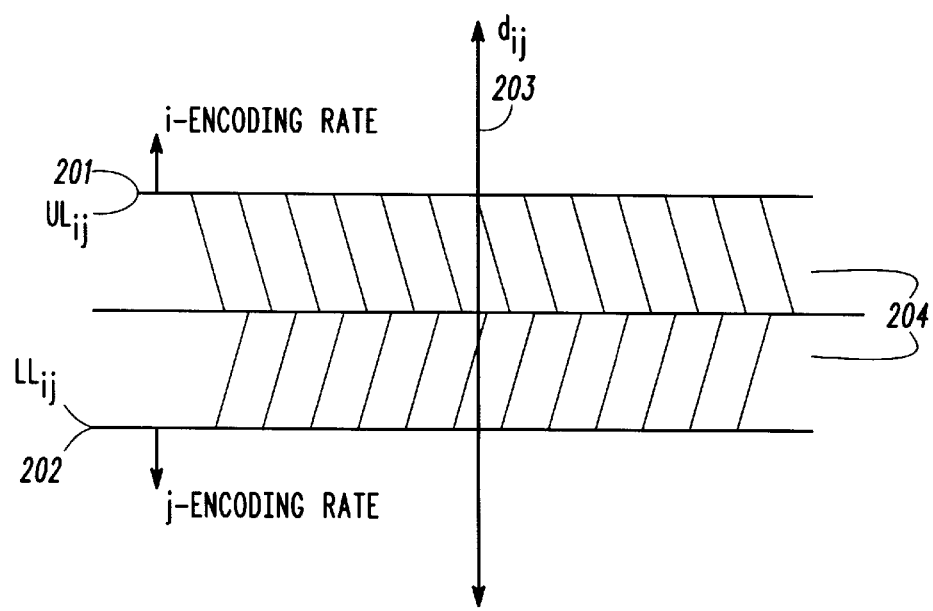
FIG. 2 depicts one or more aspects of the invention by way of a graphical representation.

This may be made clearer by referencing to a graphical representation shown in FIG. 2. The vertical ax 203 indicates discriminant function value for "dij". The corresponding plurality of ranges of predetermined values, wherein each of the plurality of ranges having an upper predetermined limit (ULij) at 201 and a lower predetermined limit (LLij) at 202 are shown accordingly. The shaded area 204 is the erasure zone. The method includes selecting one of the first, second and third rates as a determined encoding rate based on the step of comparing the plurality of discriminant functions, i.e. d12, d13 and d23, depending on whether each of the plurality of discriminant functions is above a corresponding upper predetermined range limit or below a corresponding lower predetermined range limit, i.e. UL12, UL13 and UL23, and LL12, LL13 and LL23. For example, in case of "d23", if the "d23" is above "UL23", the encoding rate "2" is selected, and if "d23" is below "LL23", the encoding rate "3" is selected.

The method further includes determining a first, second and third quality indicators corresponding to a quality of the decoded data frames at respectively the first, second and third encoding rates, and adjusting the predetermined upper and lower range limits, UL12, UL13 and UL23, and LL12, LL13 and LL23, of the plurality of ranges of predetermined values corresponding to the plurality of discriminant functions based on the first, second and third quality indicators.

The main advantage of the invention is mostly notable in accurate decoding of data information transmitted along the received data frame. Accordingly, a method of decoding data information of a received data frame in a communication system includes decoding the received data frame at a first and second encoding rates to determine a first and second total metric, and calculating a discriminant function based on the first and second total metric. The method further includes comparing the discriminant function to a range of predetermined values having an upper predetermined range limit and a lower predetermined range limit, and selecting one of the first and second encoding rates as a determined encoding rate based on the step of comparing the discriminant function depending on whether the discriminant function is above the upper predetermined range limit or below the lower predetermined range limit. To encode the data information, the method includes using the determined encoding rate. The data information may be voice data. To prevent undesired effect of inaccurate rate-determination, the method further includes the step of erasing the received data frame based on the step of comparing the discriminant function when the discriminant function is above than the lower predetermined range limit and below the upper predetermined range limit.

In an embodiment of the invention, the method of determining an encoding rate is made more accurate by resetting the UL or LL to a fixed value every time a new data frame is received, and adjusting the UL or LL depending on a value of a corresponding quality indicator, such as quality bit (QB.) Therefore, the method is further made more accurate for determining an encoding rate by determining, at step 105, a first quality indicator corresponding to a quality of the decoded received data frame at the first rate, and adjusting, through input 106, the upper predetermined range limit (UL) depending on a value of the first quality indicator from an initial value to a final value. Similarly, the method is further made more accurate for determining an encoding rate by determining, at step 105, a second quality indicator corresponding to a quality of the decoded received data frame at the second rate, and adjusting, through input 106, the lower predetermined range limit (LL) depending on a value of the second quality indicator from an initial value to a final value. Each UL or LL may have independent initial and final values.

With further aspect of the invention, the method is made more accurate by comparing the first quality indicator with a first threshold, and if the first quality indicator is above the first threshold, the adjusting step includes adjusting the upper predetermined range limit to a first upper value, and if the first quality indicator is below the first threshold, the adjusting step includes adjusting the upper range limit to a second upper value. For example, if the quality indicator being above the threshold is considered as acceptable "Good" quality, the first upper value is lower than the second upper value.

Similarly for the lower predetermined range limit, the method includes determining a second quality indicator corresponding to a quality of the decoded received data frame at the second rate, and adjusting the lower predetermined range limit depending on a value of the second quality indicator. The method includes the step of comparing the second quality indicator with a second threshold, and if the second quality indicator is above the second threshold, the adjusting step includes adjusting the lower predetermined range limit to a first lower value, if the second quality indicator is below the second threshold, the adjusting step includes adjusting the lower range limit to a second lower value. The second lower value is lower than the first lower value.

What is claimed is:

1. A method of determining an encoding rate associated with a received data frame in a communication system, the method comprising the steps of:

decoding the received data frame at a first encoding rate to determine a first total metric;

decoding the received data frame at a second encoding rate to determine a second total metric;

calculating a discriminant function based on the first and second total metric;

comparing the discriminant function to a range of predetermined values having an upper predetermined range limit and a lower predetermined range limit;

selecting one of the first and second rates as a determined encoding rate based on the step of comparing the discriminant function depending on whether the discriminant function is above the upper predetermined range limit or below the lower predetermined range limit.

2. The method as recited in claim 1 further comprising the step of erasing the received data frame based on the step of comparing the discriminant function when the discriminant function is above the lower predetermined range limit and below the upper predetermined range limit.

3. The method of claim 1 further comprising the steps of:
   determining a first quality indicator corresponding to a quality of the decoded received data frame at the first rate;
   adjusting the upper predetermined range limit depending on a value of the first quality indicator.

4. The method as recited in claim 3 further comprising the step of comparing the first quality indicator with a first threshold, and if the first quality indicator is above the first threshold, the adjusting step includes adjusting the upper predetermined range limit from a first upper value to a second upper value, and if the first quality indicator is below the first threshold, the adjusting step includes adjusting the upper range limit from the first upper value to a third upper value.

5. The method of claim 4 wherein the third upper value is higher than the first upper value.

6. The method of claim 4 wherein the second upper value is lower than the first upper value.

7. The method as recited in claim 1 further comprising the steps of:
   determining a second quality indicator corresponding to a quality of the decoded received data frame at the second rate;
   adjusting the lower predetermined range limit depending on a value of the second quality indicator.

8. The method as recited in claim 7 further comprising the step of comparing the second quality indicator with a second threshold, and if the second quality indicator is above the second threshold, the adjusting step includes adjusting the lower predetermined range limit from a first lower value to a second lower value, and if the second quality indicator is below the second threshold, the adjusting step includes adjusting the lower range limit from the first lower value to a third lower value.

9. The method of claim 8 wherein the third lower value is lower than the first lower value.

10. The method of claim 8 wherein the second lower value is higher than the first lower value.

11. The method of claim 1 further comprising the steps of:
    determining a first quality indicator corresponding to a quality of the decoded received data frame at the first rate;
    adjusting the upper predetermined range limit depending on a value of the first quality indicator from an initial value to a final value for each data frame received at the communication system.

12. The method of claim 1 further comprising the steps of:
    determining a second quality indicator corresponding to a quality of the decoded received data frame at the second rate;
    adjusting the lower predetermined range limit depending on a value of the second quality indicator from an initial value to a final value for each data frame received at the communication system.

13. The method as recited in claim 3 further comprising the steps of comparing the first quality indicator with a first threshold, and if the first quality indicator is above the first threshold, the adjusting step includes adjusting the upper predetermined range limit to a first upper value, and if the first quality indicator is below the first threshold, the adjusting step includes adjusting the upper range limit to a second upper value.

14. The method as recited in claim 7 further comprising the step of comparing the second quality indicator with a second threshold, and if the second quality indicator is above the second threshold, the adjusting step includes adjusting the lower predetermined range limit to a first lower value, if the second quality indicator is below the second threshold, the adjusting step includes adjusting the lower range limit to a second lower value.

15. A method of determining an encoding rate associated with a received data frame in a communication system, the method comprising the steps of:

decoding the received data frame at a first encoding rate to determine a first total metric;

decoding the received data frame at a second encoding rate to determine a second total metric;

decoding the received data frame at a third encoding rate to determine a third total metric;

calculating a plurality of discriminant functions based on the first, second and third total metric;

comparing the plurality of discriminant functions to a corresponding plurality of ranges of predetermined values, wherein each of the plurality of ranges having an upper predetermined limit and a lower predetermined limit;

selecting one of the first, second and third rates as a determined encoding rate based on the step of comparing the plurality of discriminant functions depending on whether each of the plurality of discriminant functions is above a corresponding upper predetermined range limit or below a corresponding lower predetermined range limit.

16. The method of claim 15 further comprising the steps of:

determining a first, second and third quality indicators corresponding to a quality of the decoded data frames at respectively the first, second and third encoding rates;

adjusting the predetermined upper and lower range limits of the plurality of ranges of predetermined values corresponding to the plurality of discriminant functions based on the first, second and third quality indicators.

17. A method of decoding data information of a received data frame in a communication system, the method comprising the steps of:

decoding the received data frame at a first encoding rate to determine a first total metric;

decoding the received data frame at a second encoding rate to determine a second total metric;

calculating a discriminant function based on the first and second total metric;

comparing the discriminant function to a range of predetermined values having an upper predetermined range limit and a lower predetermined range limit;

selecting one of the first and second encoding rates as a determined encoding rate based on the step of comparing the discriminant function depending on whether the discriminant function is above the upper predetermined range limit or below the lower predetermined range limit;

using the determined encoding rate to decode the data information of the received data frame.

18. The method of claim 17 wherein the data information is voice data.

19. The method as recited in claim 17 further comprising the step of erasing the received data frame based on the step of comparing the discriminant function when the discriminant function is above than the lower predetermined range limit and below the upper predetermined range limit.

* * * * *